US008401562B2

(12) United States Patent
Chen et al.

(10) Patent No.: US 8,401,562 B2
(45) Date of Patent: Mar. 19, 2013

(54) APPARATUS AND METHOD EMPLOYING SCHEDULER BEHAVIOR AWARE PREDICTIVE RESOURCE SELECTION IN A COMMUNICATION SYSTEM

(75) Inventors: Tao Chen, Salo (FI); Qianxi Lu, Beijing (CN)

(73) Assignee: Nokia Corporation, Espoo (FI)

( * ) Notice: Subject to any disclaimer, the term of this patent is extended or adjusted under 35 U.S.C. 154(b) by 205 days.

(21) Appl. No.: 12/948,390

(22) Filed: Nov. 17, 2010

(65) Prior Publication Data

US 2012/0122463 A1 May 17, 2012

(51) Int. Cl.
*H04W 72/04* (2009.01)
(52) U.S. Cl. ........ 455/450; 455/63.1; 370/252; 370/315
(58) Field of Classification Search .................. 455/450, 455/63.1; 370/252, 315
See application file for complete search history.

(56) References Cited

U.S. PATENT DOCUMENTS

| | | | | |
|---|---|---|---|---|
| 2007/0260851 A1* | 11/2007 | Taha et al. | ...................... | 712/204 |
| 2008/0171546 A1 | 7/2008 | Hyon et al. | | |
| 2008/0212539 A1 | 9/2008 | Bottomley et al. | | |
| 2009/0016231 A1* | 1/2009 | Li et al. | ......................... | 370/252 |
| 2010/0118761 A1* | 5/2010 | Wu et al. | ........................ | 370/315 |
| 2011/0081865 A1* | 4/2011 | Xiao et al. | .................... | 455/63.1 |

OTHER PUBLICATIONS

International Search Report international application No. PCT/FI2011/050978 dated Jan. 30, 2012.
Sang, et al., "A Predictability Analysis of Network Traffic", IEEE, Elsevier Computer Networks, vol. 39, Jan. 2002, pp. 329-345.
Clancy, et al., "Predictive Dynamic Spectrum Access", SDR Forum, Nov. 2006, 5 pages.
Yang, et al., "Proactive Channel Access in Dynamic Spectrum Networks", Proc. CrownCom, Aug. 2007, 5 pages.
Tumuluru, et al., "Channel status prediction for cognitive radio networks", Wireless Communications and Mobile Computing, vol. 10, 2010, pp. 1-13.
Haykin, et al., "Bayesian Sequential State Estimation for MIMO Wireless Communication", Proceedings of the IEEE, vol. 92, No. 3, Mar. 2004, pp. 439-454.
Haykin, "Cognitive Radio: Brain-Empowered Wireless Communications", IEEE Journal on Selected Areas in Communications, vol. 23, No. 2, Feb. 2005, pp. 201-220.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.7.0, Dec. 2008, 144 pages.

(Continued)

*Primary Examiner* — David Q Nguyen
(74) *Attorney, Agent, or Firm* — Squire, Sanders (US) LLP

(57) ABSTRACT

An apparatus, method and system to predict interference employing scheduler behavior information in a communication system. In one embodiment, an apparatus includes a processor and memory including computer program code. The memory and the computer program code are configured, with the processor, to cause the apparatus to receive scheduler behavior information for an allocation of communication resources, and produce an interference history associated with at least one of a communication resource and a user equipment operable in a cellular communication mode. The memory and the computer program code are further configured, with the processor, to cause the apparatus to predict an interference level on the communication resource as a function of the interference history and the scheduler behavior information for a user equipment operable in a device-to-device communication mode.

20 Claims, 12 Drawing Sheets

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331, V9.1.0, Dec. 2009, 233 pages.

3rd Generation Partnership Project; Technical Specification Group Radio Access Network; Radio Resource Control (RRC); Protocol Specification (Release 9), 3GPP TS 25.331, V9.1.0, Dec. 2009, 1759 pages.

3rd Generation Partnership Project; Technical Specification Group Services and System Aspects; Telecommunication management; Home enhanced Node B (HeNB) Subsystem (HeNS); Network Resource Model (NRM); Integration Reference Point (IRP); Requirements (Release 9), 3GPP TS 32.781, V9.1.0, Dec. 2010, 9 pages.

\* cited by examiner

APPARATUS AND METHOD EMPLOYING SCHEDULER BEHAVIOR AWARE PREDICTIVE RESOURCE SELECTION IN A COMMUNICATION SYSTEM

TECHNICAL FIELD

The present invention is directed, in general, to communication systems and, in particular, to an apparatus, method and system to predict interference employing scheduler behavior information in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/media access control/physical ("PDCP/RLC/MAC/PHY") sublayers) and control plane (including a radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the communication or radio resource control management, see 3GPP TS 25.331 v.9.1.0 (2009-12) and 3GPP TS 36.331 v.9.1.0 (2009-12), which are incorporated herein by reference.

As wireless radio communication systems such as cellular telephone, satellite, and microwave communication systems become widely deployed and continue to attract a growing number of users, there is a pressing need to accommodate efficiently a large and variable number of communication devices that transmit an increasing quantity of data within a fixed spectral allocation and limited transmitter power levels. The increased quantity of data is a consequence of wireless communication devices transmitting video information and surfing the Internet, as well as performing ordinary voice communications. Such processes are generally performed while accommodating substantially simultaneous operation of a large number of wireless communication devices.

At present, there are mainly two kinds of wireless communication system or network architectures, centralized and distributed. A centralized communication network can be taken as a conventional infrastructure-based cellular communication network whereas an ad-hoc communication network exemplifies a distributed communication network. In a centralized cellular communication network (also referred to as a primary communication system), a wireless communication device such as user equipment communicates with another wireless communication device such as user equipment through a base station, which is also referred to as primary spectrum usage. However in an ad-hoc communication network (also referred to as a secondary communication system), the user equipment communicates directly with another user equipment (or through a relay), which is also referred to as secondary spectrum usage. In the primary communication system, traffic goes through a centralized controller such as a base station even if the source and destination user equipment close to each other. The main benefit of such operation is easy communication resource and interference control, but the obvious drawback is inefficient communication resource utilization. For example, significantly more communication resources are generally required for cellular communications (or a cellular communication mode) compared to a device-to-device ("D2D") communications (or D2D communication mode) when the user equipment are relatively close.

To achieve better system throughput, a future radio communication system or network will likely operate in multiple communication modes. Such a hybrid operation can provide high system performance due to spectrum communication resource sharing by user equipment operating in cellular and D2D communication modes, but interference between the primary and secondary communication systems becomes an issue when cellular spectrum is reused by user equipment operating in the D2D communication mode. Since the user equipment can operate in both communication modes, interference associated with the user equipment operable in the communication modes should be resolved. Thus, there is need for an improved system and method that can addresses interference issues for wireless communication devices operable in primary and secondary communication systems that avoids the deficiencies of current communication systems.

SUMMARY OF THE INVENTION

These and other problems are generally solved or circumvented, and technical advantages are generally achieved, by embodiments of the present invention, which include an apparatus, method and system to predict interference employing scheduler behavior information in a communication system. In one embodiment, an apparatus includes a processor and memory including computer program code. The memory and the computer program code are configured, with the processor, to cause the apparatus to receive scheduler behavior information for an allocation of communication resources, and produce an interference history associated with at least one of a communication resource and a user equipment operable in a cellular communication mode. The memory and the computer program code are further configured, with the processor, to cause the apparatus to predict an interference level on the communication resource as a function of the interference history and the scheduler behavior information for a user equipment operable in a device-to-device communication mode.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system to reduce interference for wireless communication devices operable in primary and secondary communication systems. The apparatus, method and system are applicable, without limitation, to any communication system including existing and future 3GPP technologies such as UMTS, LTE, GSM, and its future variants such as 4th generation ("4G") communication systems.

Figure 1:
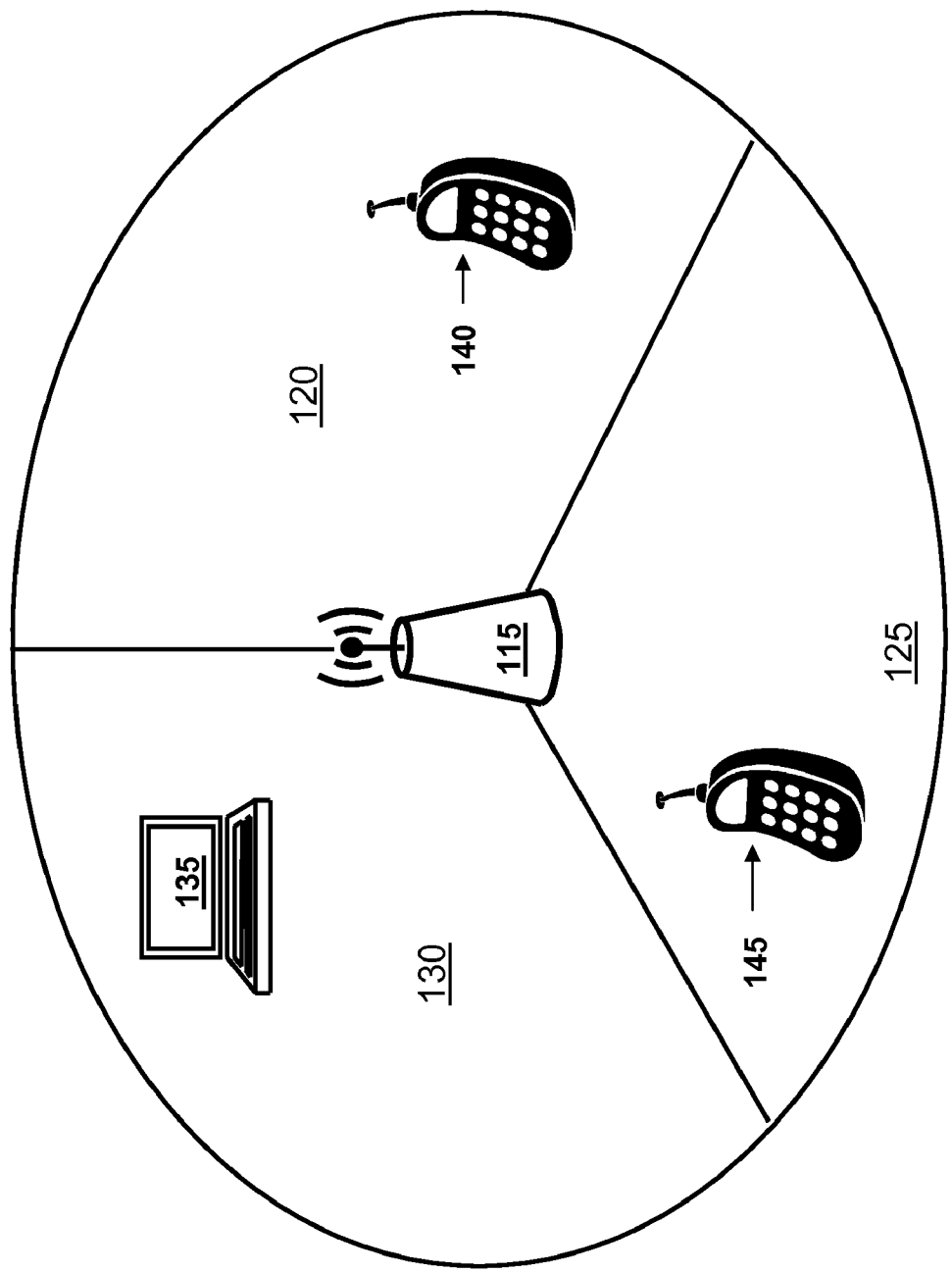
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. The three sectors or more than three sectors are configured per frequency, and one base station 115 can support more than one frequency. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, D2D and machine-to-machine communications or other communications. Additionally, the wireless communication devices 135, 140, 145 may form communication nodes along with other devices in the communication system.

Figure 2:
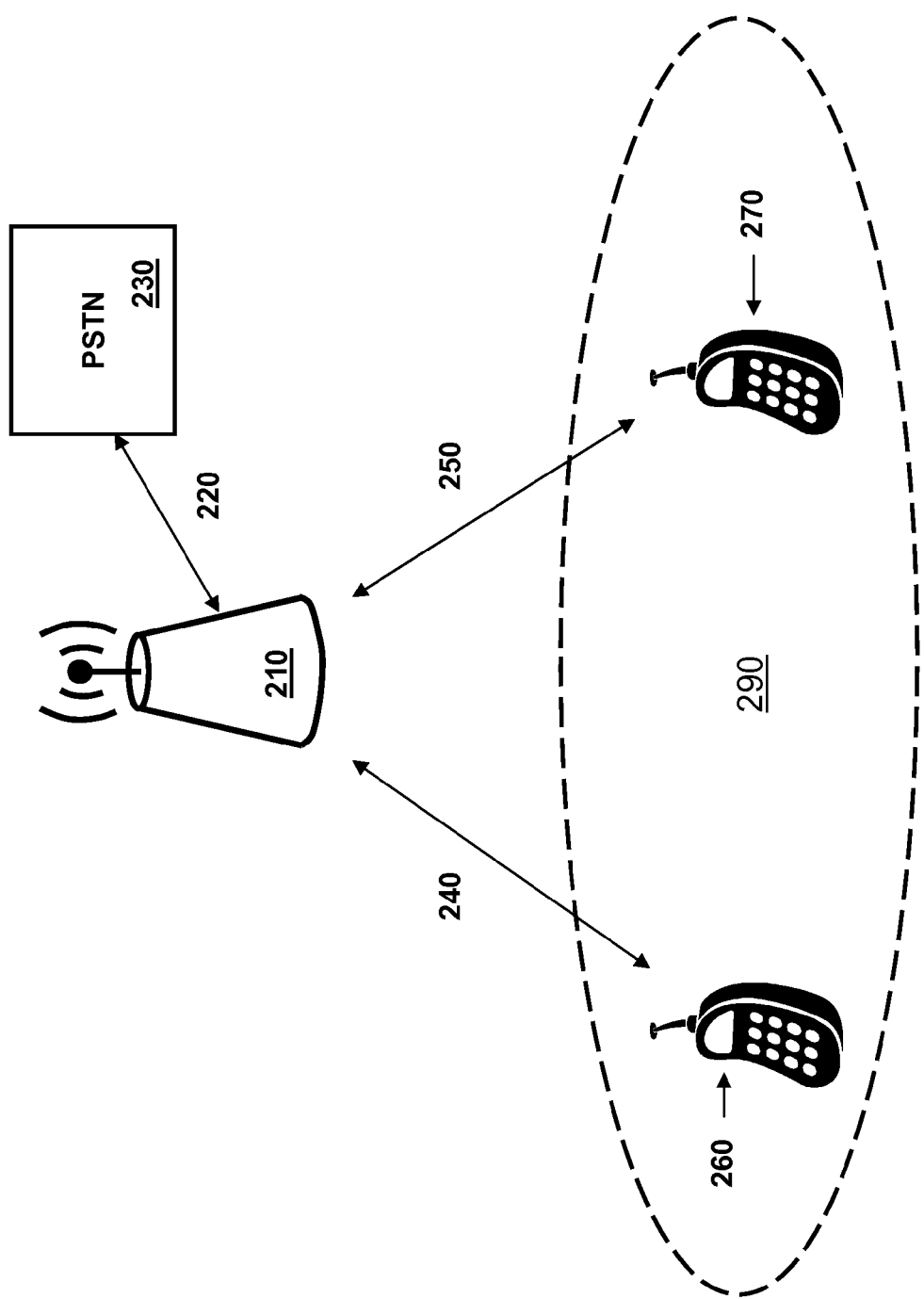

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications. Additionally, the wireless communication devices 260, 270 may form communication nodes along with other devices in the communication system.

Figure 3:
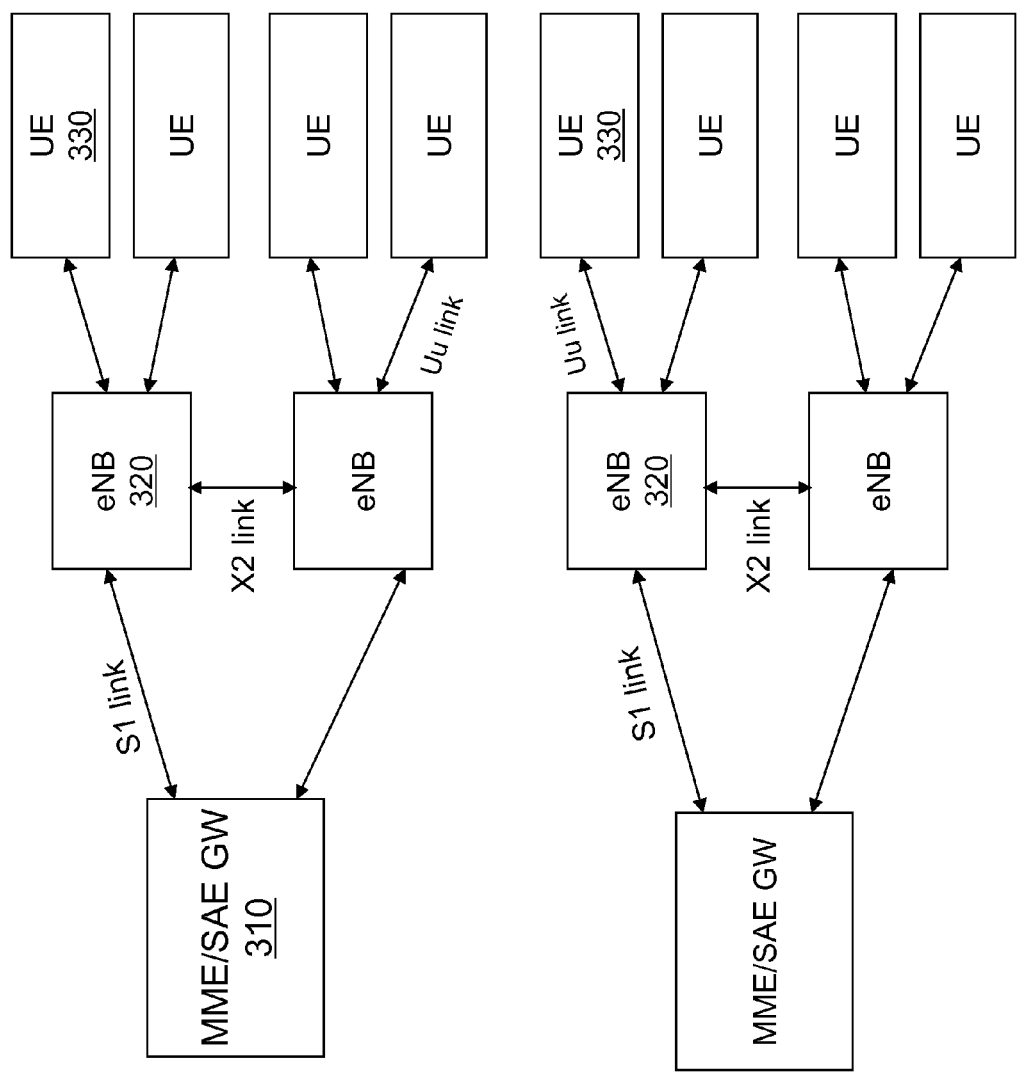
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency communication paths such as coaxial links, or combinations thereof.

The base stations 320 communicate with wireless communication devices such as user equipment ("UE," ones of which are designated 330), which is typically a mobile transceiver carried by a user. Thus, the communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. While the user equipment 330 are part of a primary communication system, the user equipment 330 and other devices such as machines (not shown) may be a part of a secondary communication system to participate in, without limitation, D2D and machine-to-machine communications or other communications. Additionally, the user equipment 330 may form a communication node along with other devices in the communication system.

Figure 4:
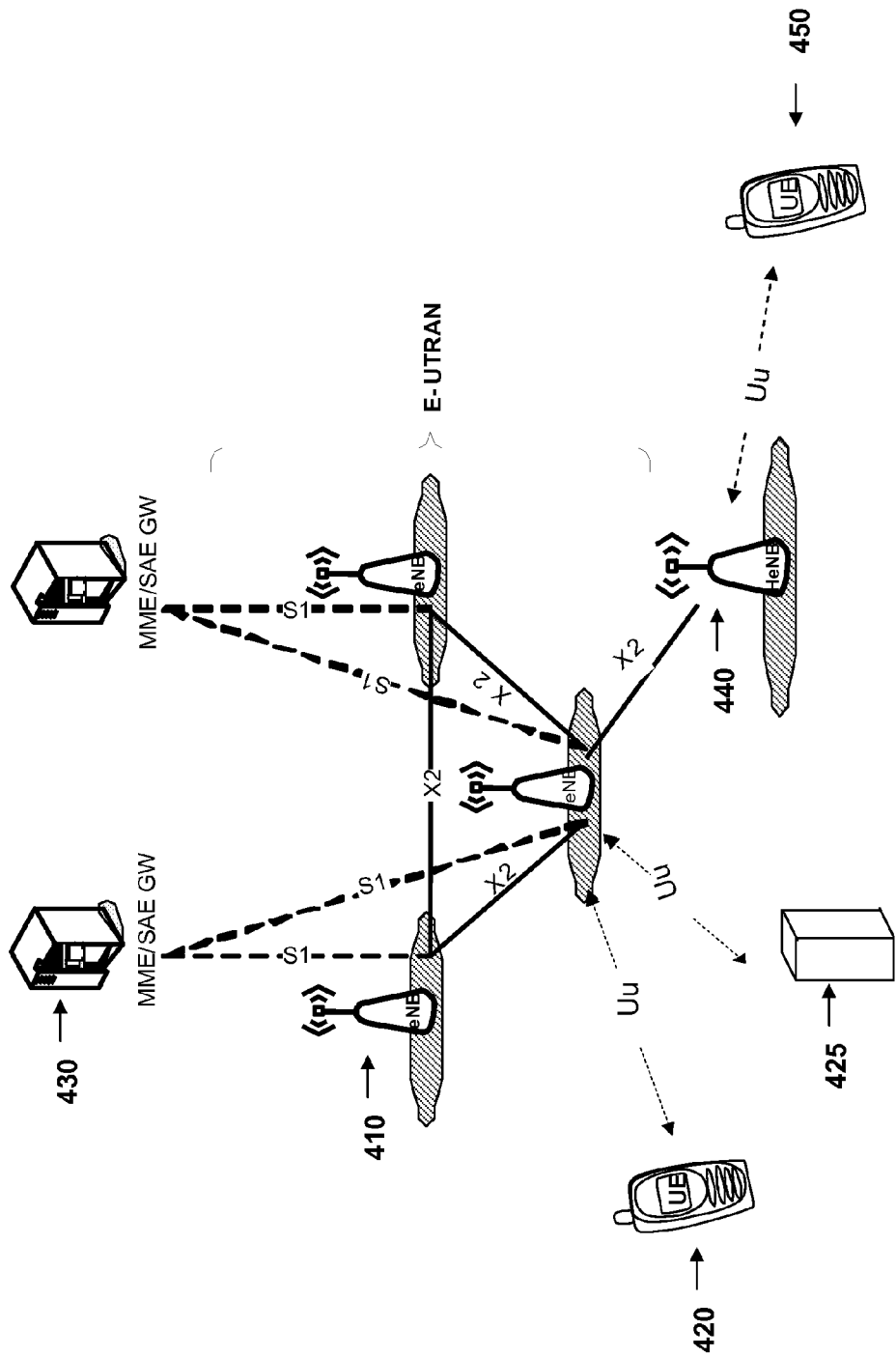

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 are interconnected with X2 interfaces or communication links (designated "X2") and are connected to the wireless communication devices such as user equipment 420 and other devices such as machines 425 via Uu interfaces or communication links (designated "Uu"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as Internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 and machines 425 receive an allocation of a group of information elements from the base stations 410.

Additionally, the ones of the base stations 410 are coupled a home base station 440 (a device), which is coupled to devices such as user equipment 450 and/or machines (not shown) for a secondary communication system. The base station 410 can allocate secondary communication system resources directly to the user equipment 450 and machines, or to the home base station 440 for communications (e.g., local or D2D communications) within the secondary communication system. Additionally, the secondary communication resources can be selected by the user equipment 450 and machines without intervention by the base station 410 for the D2D communications in a distributed manner. The secondary communication resources can overlap with communication resources employed by the base station 410 to communicate with the user equipment 420 within its serving area. For a better understanding of home base stations (designated "HeNB"), see 3 GPP TS 32.781 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, D2D and machine-to-machine communications or other communications. Additionally, the user equipment 420 and machines 425 may form communication nodes along with other devices in the communication system.

Figure 5:
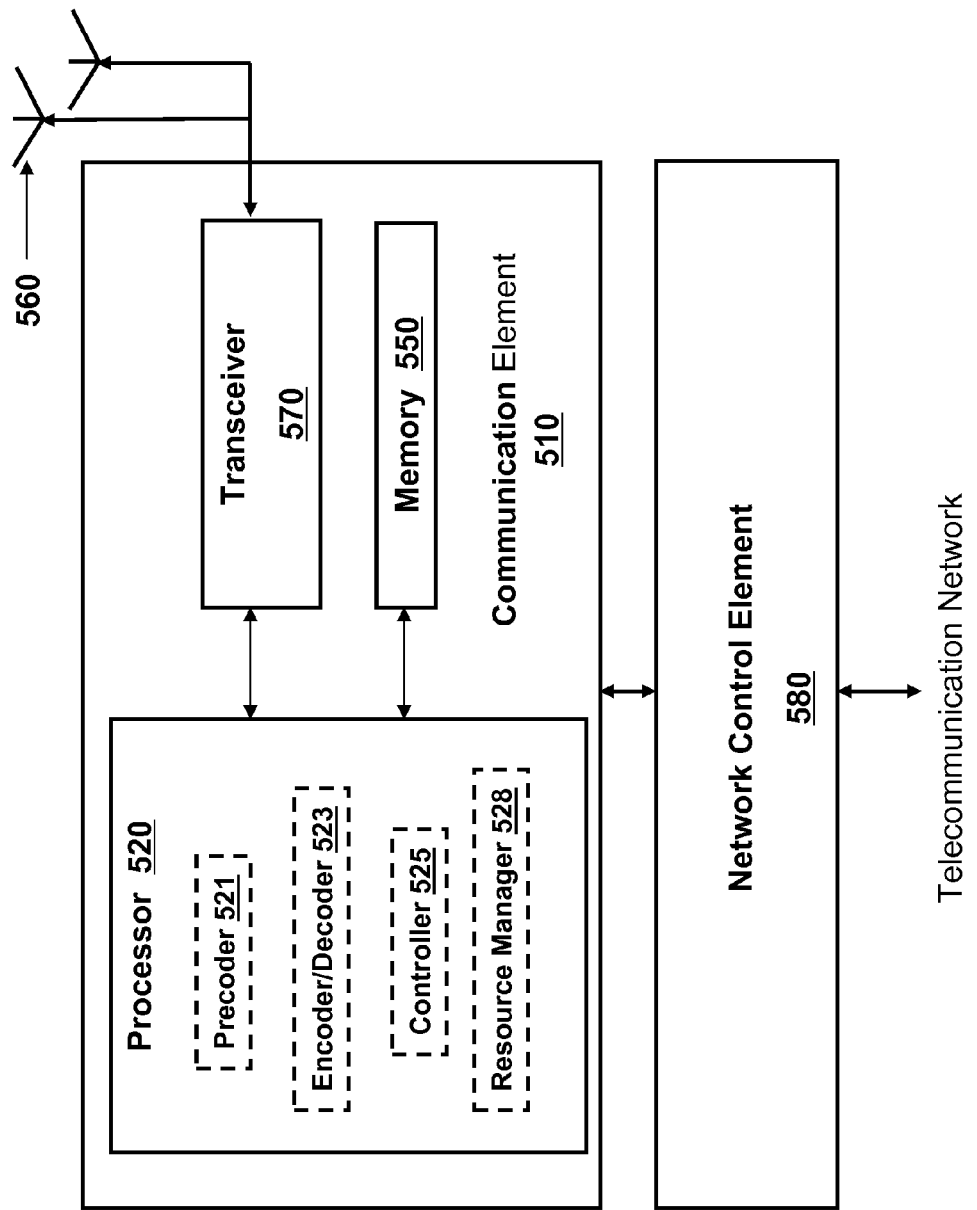
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. Additionally, the communication element or device 510 may form a communication node along with other devices in the communication system. When the communication element or device 510 represents a communication node such as a user equipment, the user equipment may be configured to communicate with another communication node such as another user equipment employing one or more base stations as intermediaries in the communication path (referred to as cellular communications). The user equipment may also be configured to communicate directly with another user equipment without direct intervention of the base station in the communication path (referred to a D2D communications). The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communications. The communication element 510 may be formed with a plurality of antennas to enable a multiple-input multiple output ("MIMO") mode of operation. The communication element 510 may provide point-to-point and/or point-to-multipoint communication services.

The communication element 510, such as a base station in a cellular communication system or network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communications, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like.

For instance and when the communication element 510 is embodied in a user equipment, the resource manager 528 (in accordance with the memory 550) is configured to receive scheduler behavior information for an allocation of communication resources, and produce an interference history associated with at least one of a communication resource and a user equipment operable in a cellular communication mode. The resource manager 528 is also configured to predict an interference level on the communication resource as a function of the interference history and the scheduler behavior information for a user equipment operable in a device-to-device communication mode. In another embodiment, the resource manager 528 is configured to receive scheduler behavior information for an allocation of communication resources, and determine a transmission time interval to decode a physical downlink control channel of a user equipment in accordance with the scheduler behavior information. When the communication element 510 is embodied in a base station, the resource manager 528 (in accordance with the memory 550) is configured to initiate a transmission of scheduler behavior information for an allocation of communication resources to a user equipment.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna(s) 560 to another communication element. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

Figure 6:
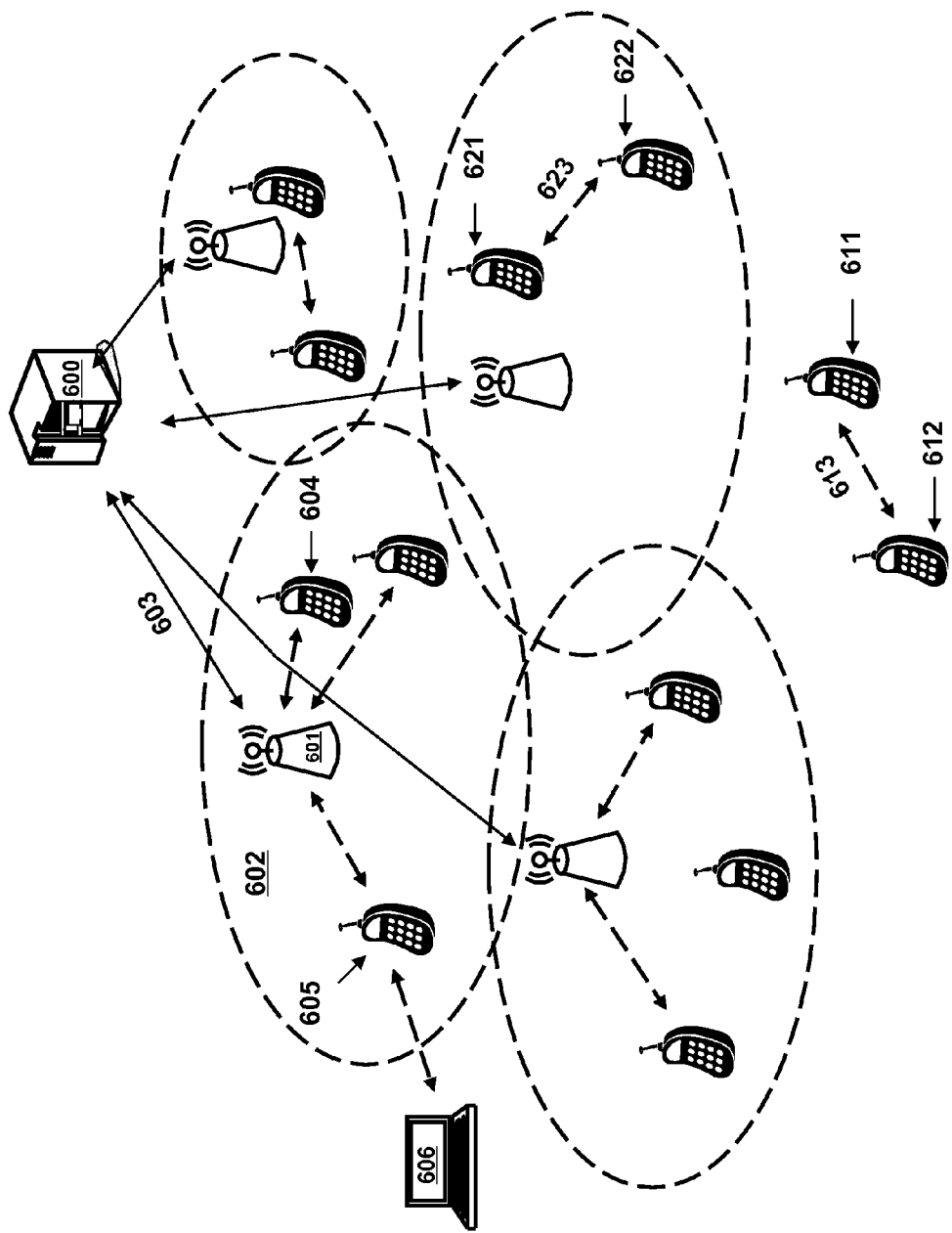
FIGS. 6 and 7 illustrate system level diagrams of embodiments of communication systems demonstrating a hybrid communication system that provides an environment for the application of the principles of the present invention.
Figure 7:
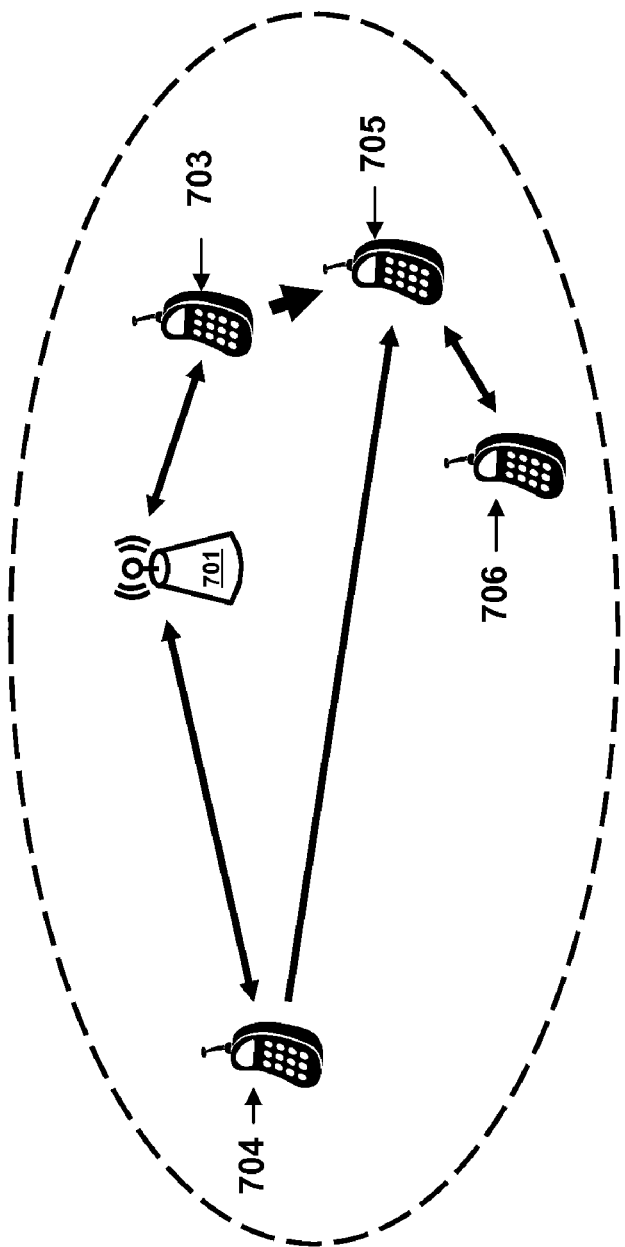

Turning now to FIGS. 6 and 7, illustrated are system level diagrams of embodiments of communication systems demonstrating a hybrid communication system that provides an environment for the application of the principles of the present invention. The communication system of FIG. 6 includes a plurality of base stations such as a base station 601 with its serving area 602 that communicates with a mobile management entity/system architecture evolution gateway 600 over a communication path or link 603 that may be formed with fiberguide. The base station 601 communicates with user equipment such as user equipment 604 over a wireless communication path or link. The base station 601 can communicate with user equipment outside its serving area 602 such as with a personal computer 606 through user equipment 605 acting as a relay. Other user equipment 621, 622 within the serving area of a base station may communicate with each other in a D2D communication mode over communication path or link 623. Other user equipment 611, 612 may communicate with each other in a D2D communication mode over a communication path or link 613 that lies outside of the serving area of a base station. Thus, a user equipment can participate in a cellular or D2D communication mode in the communication system with a high level of performance.

FIG. 7 illustrates a case of interference from cellular uplink transmission to D2D transmission in an uplink spectrum of frequencies wherein user equipment operable in a D2D communication mode attempts to avoid interference from user equipment operable in a cellular communications mode. In FIG. 7, user equipment 703 and user equipment 704 are operable in a cellular communication mode via a base station 701, whereas user equipment 705 communicates directly with user equipment 706 in a D2D communication mode. When the user equipment use a (primary) cellular communication resource for secondary usage (i.e., for a D2D communication), the secondary spectrum availability generally depends on activity of interfering or interfered user equipment operating in a cellular communication mode. The user equipment 703 generates more interference to the D2D transmission between user equipment 705 and the user equipment 706 due to its proximity in physical position. Therefore, the user equipment 705, 706 generally reuse a communication resource allocated to the more distant user equipment 704, which produces a lower level of interference for the user equipment 705 for the D2D communications. For the opposite case of a downlink spectrum of frequencies, the interference direction is from the user equipment operable in the D2D communication mode to the user equipment operable in the cellular communication mode.

To solve the interference problem that occurs when the secondary spectrum is used for D2D communication, two interference avoidance schemes have been previously discussed including reactive spectrum access and proactive spectrum access. In reactive spectrum access, a user equipment employing secondary communication resources (i.e., a user equipment operable in a D2D communication mode) communicates over a channel until a user equipment operable in a cellular communication mode is detected on that channel. However, this arrangement is not acceptable when primary spectrum usage is dynamically changed. For example, a primary LTE-based communication system can update a cellular communication resource allocation every transmission time interval ("TTI"), which produces a different interference signal every transmission time interval.

In proactive spectrum access, user equipment employing secondary communication resources utilize past channel observations to estimate future spectrum availability. Research on proactive spectrum access has been described in papers by T. C. Clancy and B. D. Walker, entitled "Predictive Dynamic Spectrum Access," presented in SDR Forum, November 2006, by L. Yang, L. Cao, and H. Zheng, entitled "Proactive Channel Access in Dynamic Spectrum Networks," in Proc. CrownCom, August 2007, and by A. Sang and S. Li, entitled "A Predictability Analysis of Network Traffic," Elsevier Computer Networks, Vol. 39, pp. 329-345, January 2002, which papers are incorporated herein by reference. In general, user equipment operable in the D2D communication mode learn from past experience to improve prediction of future interference (i.e., appropriate communication resources are employed for third-party (D2D) access without interrupting licensed (cellular) traffic).

In a hybrid communication system operable with both an infrastructure-based (e.g., cellular) communication system and an ad-hoc communication system, the cellular communication resource scheduling is heavily dependent on the behavior of a scheduler in a central controller of the cellular communication system. In the case of reactive spectrum access for user equipment operable in a D2D communication mode, since the user equipment first have to sense the channel, there may be insufficient time for transmission within one transmission time interval because cellular communication resource scheduling can be changed every transmission time interval. In the case of proactive spectrum access for user equipment operable in a D2D communication mode, an accurate prediction may not be able to be made without scheduling information. Employing known reactive and proactive spectrum access techniques, it is often difficult for the user equipment operable in a D2D communication mode to reliably predict primary spectrum usage over a communication channel.

Several further interference-avoidance schemes have been introduced to address interference problems in hybrid communication systems. In one example, interference is measured from user equipment operable in a cellular communication mode based on a list of user equipment supplied by a base station. This addresses the interference problem in an LTE-based communication system by broadcasting cellular radio network temporary identifiers ("C-RNTIs"). To remove the dependency on C-RNTI broadcasting, a group-based scheme has also been described to assist an interference avoidance mechanism. These interference-avoidance schemes generally rely on decoding of instant uplink communication resource scheduling-related information (i.e., uplink grant or group-based scheduler behavior information, in all communication resource-specifying locations in uplink subframes). Such decoding of a physical downlink control channel ("PDCCH") of scheduling commands are repeated every transmission time interval, which employ a high level of user equipment processing capability and a strict timing limit for D2D transmissions.

Thus, a satisfactory technique to manage interference between primary and secondary spectrum usage is not available for user equipment operable in a D2D communication mode in hybrid communication system. In conventional hybrid communication system, scheduler behavior information is not sent from a base station to support an interference prediction procedure for user equipment operable in a D2D communication mode. As introduced herein, a apparatus, system and method for proactive spectrum access are employed for secondary spectrum usage in a hybrid communication system. A prediction-based method utilizing assistance provided by scheduler behavior information from a base station or the like is employed for interference avoidance. Different than information carried on scheduling commands per transmission time interval, the scheduler behavior information includes information about the scheduling procedure that is used by the base station and the active user number for the scheduling. In the ad-hoc communication elements of the communication system, the user equipment operable in a D2D communication mode applies scheduler behavior information transmitted from a primary communication system element such as a base station to predict a future interference environment for avoidance of interference between primary and secondary communication systems. Although the apparatus, system and method introduced herein are described with reference to a 3GPP LTE-based communication system, the principles may be applied to other hybrid communication system and network architectures.

Figure 8:
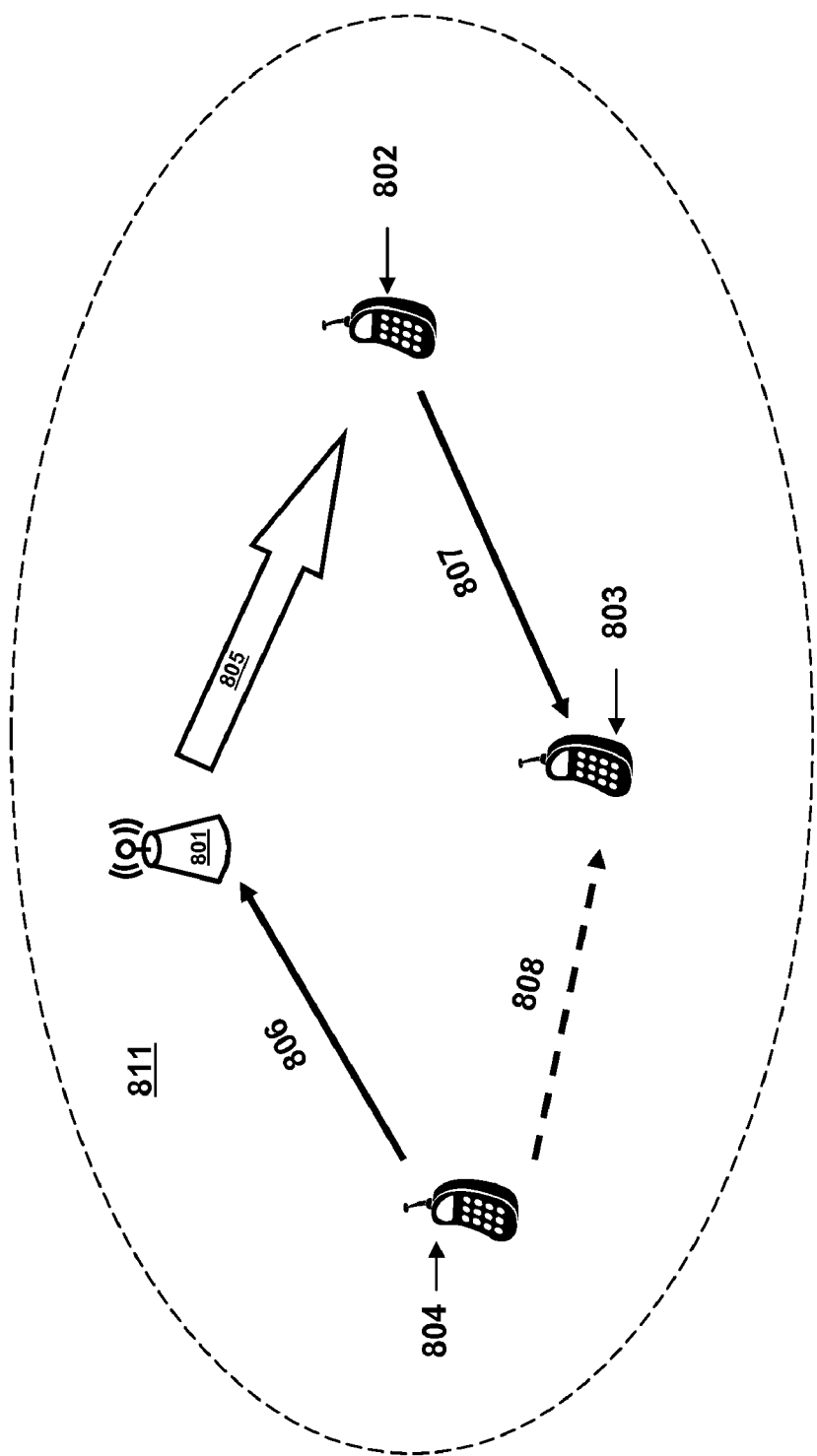
FIG. 8 illustrates a system level diagram of an embodiment of a communication system demonstrating an exemplary operation to avoid interference between user equipment according to the principles of the present invention.

Turning now to FIG. 8, illustrated is a system level diagram of an embodiment of a communication system demonstrating an exemplary operation to avoid interference between user equipment according to the principles of the present invention. A base station 801 of the hybrid communication system provides scheduler behavior information 805 to user equipment 802 for an autonomous predictive D2D communication resource selection scheme including a predictive communication resource selection of D2D transmissions. The user equipment 802 communicates with user equipment 803 over communication path or link 807. The predictive communication resource selection of D2D transmissions would be intended to avoid interference from or to cellular transmissions, such as an interference 808 to user equipment 803 (operable in a D2D communication mode) from a cellular transmission from the user equipment 804 to the base station 801 in an uplink 806.

Signaling of scheduler behavior information 805 transmitted from the base station 801 conveys behavior of the base station 801 cellular scheduler to user equipment operable in a D2D communication mode such as user equipment 802 in the respective serving cell 811. Scheduler behavior information 805 transmitted by the base station 801 can be in any of various formats, and can include several key elements of data in information elements ("IEs") that the base station transmits. The base station can signal its primary system scheduling (e.g., which scheduling criterion it is using) such as round robin ("RR"), proportional fairness ("PF") or maximum rate. This information is not user equipment specific, and can include uplink/downlink communication resource scheduling of information operative over a long term rather than a brief period of time. The information elements can include the length of the respective time interval for user equipment operable in a cellular communication mode if round robin scheduling is applied (e.g., semi-persistent scheduling is being used for voice over internet protocol ("VoIP") traffic). This information could be specific for a particular user equipment or for a group of user equipment operable in the cellular communication mode. The information elements can include the active user equipment number, which can be used (e.g., by user equipment operable in the D2D communication mode), to derive how often the user equipment operable in the cellular communication mode could be scheduled. The information elements can also include a hybrid automatic repeat request process number, which can be used (e.g., by user equipment operable in the D2D communication mode) to derive a retransmission period for the user equipment operable in the cellular communication mode. Other scheduler behavior information operative over a long period of time (i.e., over many transmission time intervals) could also be signaled in an information element by a base station.

Scheduler behavior information broadcast by a base station either can be broadcast in its serving cell via a common channel or sent to a specific user equipment operable in the D2D communication mode in a dedicated manner (e.g., over a PDCCH). In the context of a cognitive radio-based communication system, scheduler behavior information can be broadcast via a cognitive pilot channel ("CPC"). Cognitive radio-based communication systems generally are such communication systems in which communication elements such as base stations and user equipment sense channel conditions in communication resource elements or blocks to aid selection and allocation of communication resources. Updates of scheduler behavior information transmitted by a base station can be time- or event-triggered, depending on a changing cycle of a scheduling strategy, a user equipment load or traffic type, etc.

Figure 9:
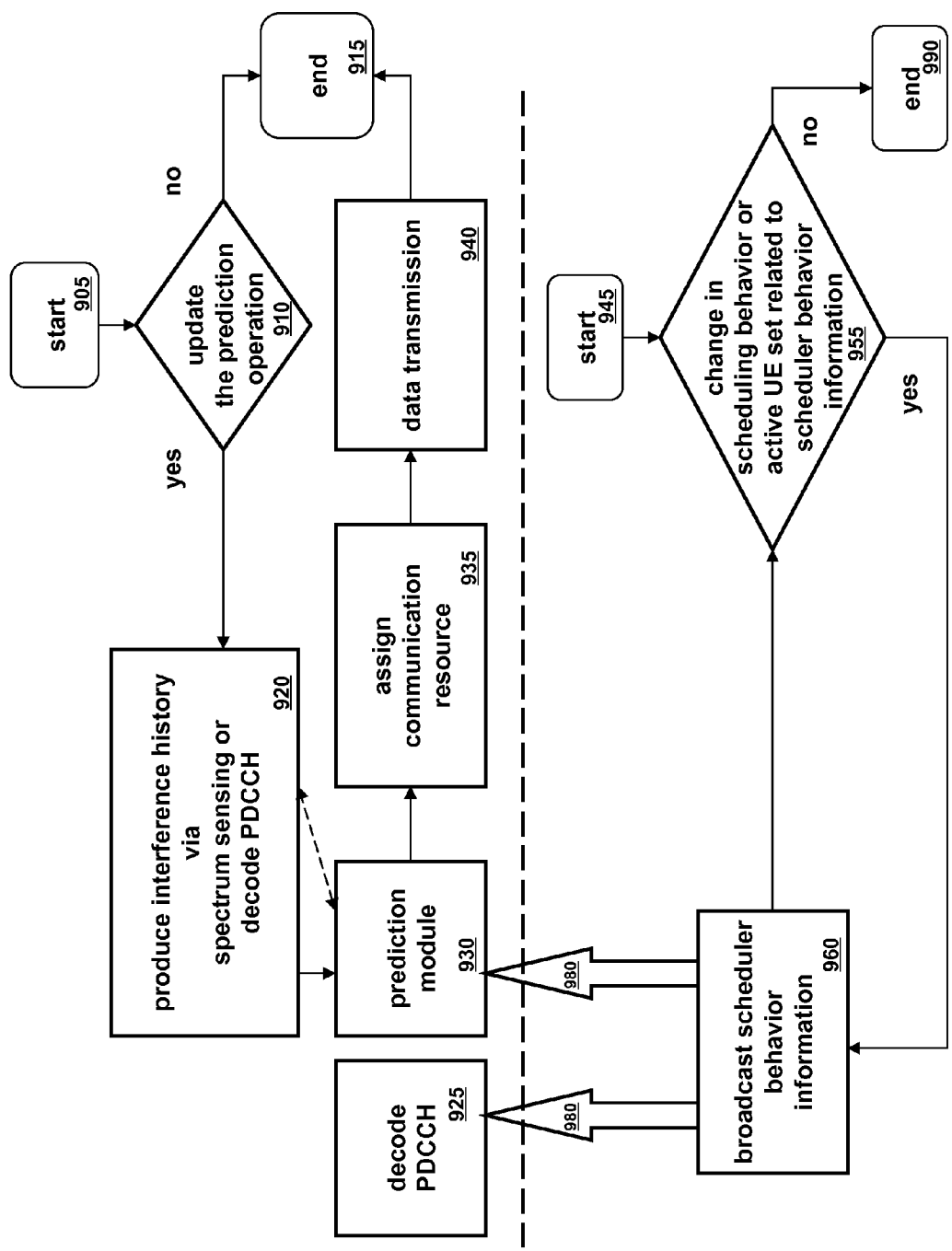
FIG. 9 illustrates a flow diagram of an embodiment of a method of operating a communication system according to the principles of the present invention.

Turning now to FIG. 9, illustrated is a flow diagram of an embodiment of a method of operating a communication system according to the principles of the present invention. The method provides an autonomous predictive D2D communication resource selection scheme to avoid interference from or to cellular transmissions employing scheduler behavior information transmitted by a central controller (e.g., a base station). Steps of the process may be employed by user equipment operable in a D2D communication mode to reduce the need to continually decode a PDCCH.

The method begins in a step or module 905 and proceeds to a step or module 910 wherein a user equipment operable in the D2D communication mode determines if an interference prediction operation should be updated, which can be an event- or time-based determination. If the prediction operation is not ready to be updated, the method ends at a step or module 915. Otherwise, the user equipment produces an interference history associated with at least one of a communication resource and a user equipment operable in a cellular communication mode at a step or module 920. The user equipment may determine the interference history by performing spectrum sensing of communication channel characteristics such as sensing of communication channel noise and/or the presence and magnitude of an active carrier in candidate communication resource elements that the user equipment might use for D2D communications. Alternatively, the user equipment may decode a PDCCH of the user equipment operable in a cellular communication mode to produce the interference history. The interference history is stored in memory of the user equipment.

The method continues in a step or module 930, which implements a prediction module to enable predictive communication resource selection for D2D communication resources. The predictive communication resource selection of user equipment operable in a D2D communication mode is based on past experience of inter-system interference history (i.e., between primary and secondary spectrum usage) that is implemented by the spectrum sensing operation. Also as mentioned above, the predictive communication resource selection may implement utilization of PDCCH decoding to find a receiving user equipment operable in a cellular communication mode in a downlink, and adds the result to the interference history. Alternatively, the method can decode broadcast information to find a receiving user equipment operable in a cellular communication mode in a downlink, and then add the result to the interference history. After receiving scheduler behavior information (designated by arrow 980) from a base station, the user equipment predicts an interference level on the communication resource as a function of the interference history and the scheduler behavior information for the user equipment to operate in the D2D communication mode in a prediction step or module 930 (a prediction procedure dependent on the received scheduler behavior information). The scheduler behavior information can also be broadcast by a base station on a broadcast channel.

Thus, the user equipment operable in the D2D communication mode can use two approaches to predict an interference level. In a first approach, the user equipment can utilize interference sensing combined with scheduler behavior reported by the base station. In a second approach, the user equipment can utilize a result of decoding a PDCCH of user equipment operable in the cellular communication mode directly as it approaches the time determined by the scheduler behavior (i.e., scheduler behavior information is utilized to determine a next transmission time interval to decode a PDCCH). Also, in a separate operation (demonstrated by a step or module 925) or combined operation with the predictive D2D communication resource selection scheme, a user equipment can employ scheduler behavior information to determine a next transmission time interval to decode its own PDCCH, thereby conserving its own processing and receiving communication resources.

The output of the prediction module 930 can be employed in several ways. First, it can be used to improve the performance of spectrum sensing by confirming an availability of a communication resource for the D2D communication. In other words, the method may perform another spectrum sensing operation based on the results of the prediction module to confirm the availability of a communication resource for the D2D communication due to the predicted interference level of the communication resource. Based thereon or without performing the subsequent spectrum sensing operation, the user equipment my assign the communication resource for the D2D communication in a step or module 935. For instance, the user equipment may perform a radio resource management ("RRM") decision to assign time-frequency communication resources for data transmission and selection of an associated modulation control scheme ("MCS") considering the predicted interference level, etc. Based on the assigned communication resources, the user equipment transmits data in a D2D communication mode to another user equipment in a step or module 940 and the method ends at the step or module 915.

The corresponding process performed in a base station starts at step or module 945. In step or module 955, the base station determines if a change in scheduling behavior or an active set of user equipment related to scheduler behavior information has occurred (e.g., the change in scheduling behavior can be event or time triggered) and, if so, the method initiates a broadcast of scheduler behavior information in step or module 960. If not, the method ends in step or module 990. In the step or module 960, the update is performed at the base station, the results of which are transmitted as scheduler behavior information 980 to devices such as user equipment. The base station can transmit scheduler behavior information, without limitation, on a broadcast channel or on a dedicated channel via radio resource signaling.

The process introduced herein is different from earlier processes that rely on uplink grant signaling included in a PDCCH four transmission time intervals in advance of uplink data transmissions. The earlier processes cannot be applied in a downlink where the downlink scheduling signaling in the PDCCH is in the same transmission time interval of the downlink data transmission because there is insufficient time for D2D communication processing. In the earlier processes, decoding of the PDCCH is always required during the D2D transmission period. However, utilizing the predictive approach employing scheduler behavior information introduced herein, a D2D communication reusing downlink spectrum can be readily implemented in a practical system, and continuous PDCCH decoding is not required. If the prediction procedure utilizes a local measurement (e.g., an interference measurement on cellular uplink communication resources), continuous PDCCH decoding is not required. Even though PDCCH decoding may be employed from time to time to obtain information about user equipment operating in the cellular communication mode, the user equipment operating in the D2D communication mode does not have to further decode a PDCCH once training to the prediction procedure is finished (i.e., the prediction result can be taken as reliable and stable). Several exemplary prediction examples are now described. As illustrated by the examples that follow, scheduler behavior information advantageously can significantly improve performance and computing communication resource utilization of an interference predication scheme.

Figure 10:
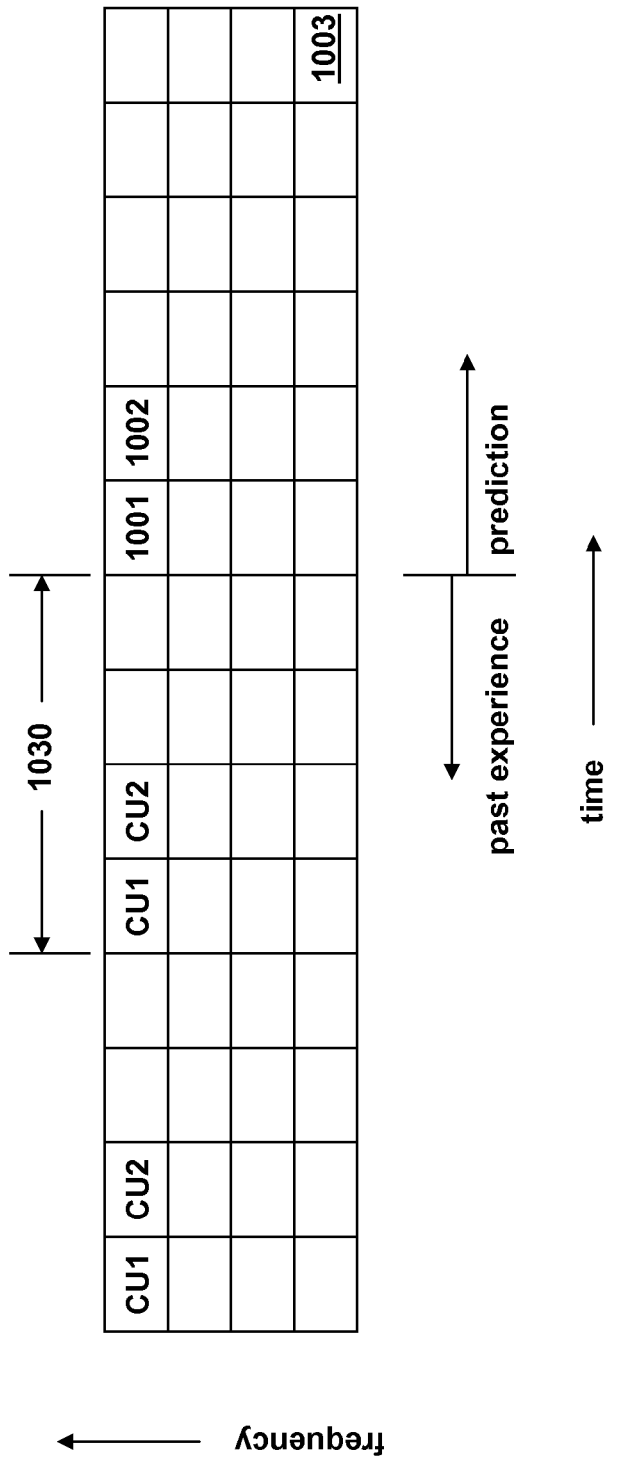
FIGS. 10 and 11 illustrated diagrams of exemplary allocations of communication resources for user equipment according to the principles of the present invention.
Figure 11:
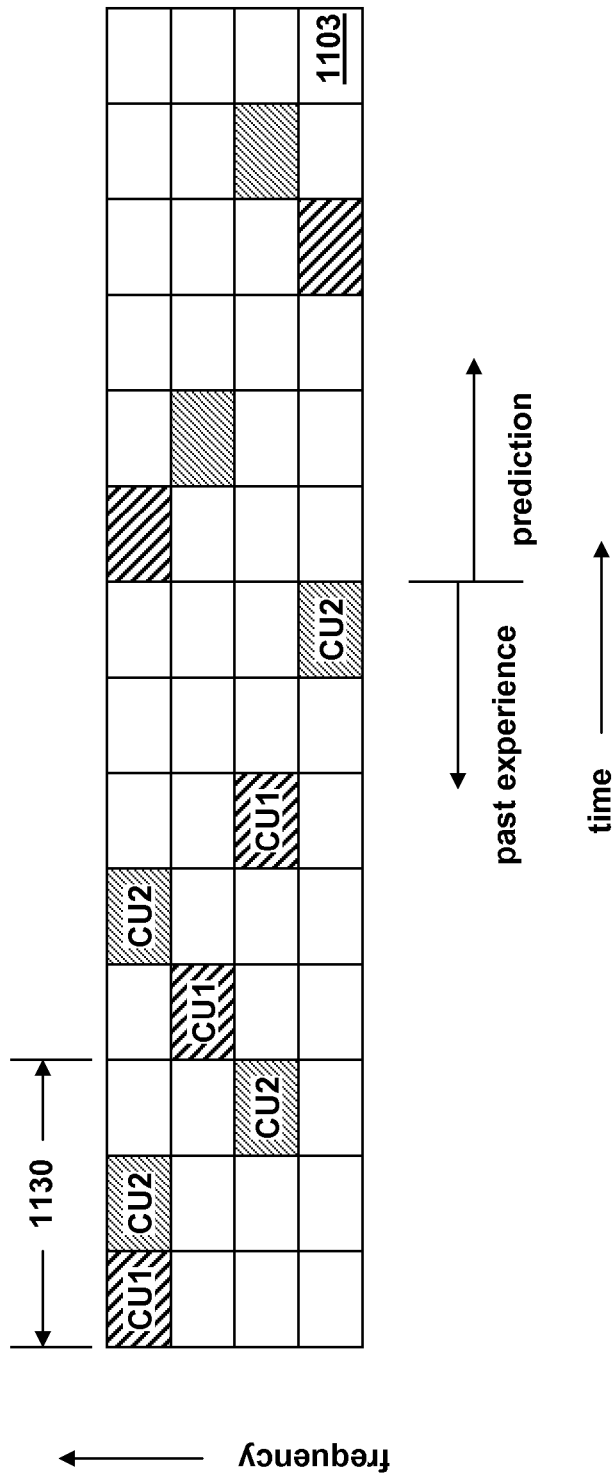

Turning now to FIGS. 10 and 11, illustrated are diagrams of exemplary allocations of communication resources (e.g., communication resource elements) for user equipment according to the principles of the present invention. The allocation of communication resources performed by a communication system controller such as a base station may be provided to user equipment in the form of scheduler behavior information. The allocation of communication resources as illustrated in FIG. 10 provides an indication of potential interference based on a round robin ("RR") scheduling procedure. The communication resource elements (e.g., communication resource element 1003) represent time-frequency communication resource elements, with transmission time intervals represented on the horizontal axis and carriers on the vertical axis. Past experience of communication resource element utilization is illustrated as "past experience," and predicted future communication resource element utilization is illustrated as "prediction.". A fixed time interval in a round robin scheduling procedure for scheduled user equipment is illustrated as the time interval 1030. In FIG. 10, first and second user equipment operable in a cellular communication mode are designated CU1, CU2, respectively, which may cause or experience interference to or from D2D communications on uplink/downlink spectrum of a base station. Communication resource elements 1001, 1002 represent predicted future utilization of time-frequency communication resource elements by the user equipment CU1, CU2 based on a round robin scheduling procedure indicated in scheduler behavior information. The prediction procedure illustrated in FIG. 10 advances the most recent communication resource element utilization ahead by the fixed round robin time interval, which can be included in scheduler behavior information transmitted by the base station.

The round robin interference prediction procedure can be summarized as follows. Assume the first two communication resource elements for the interfering user equipment operating in a cellular communication mode cannot be reused for D2D communications (with or without PDCCH decoding) at one transmission time interval. This information could be taken as the past experience that is used in prediction of later interference. For example, in the next transmission time interval, it is unlikely that the same user equipment operating in the cellular communication mode would be scheduled again due to the round robin scheduling procedure.

The scheduler behavior information indicates key parameters of cellular communication scheduling in accordance with a scheduling procedure such as round robin with a fixed interval of four transmission time intervals, as illustrated in FIG. 10 by the time interval 1030 of duration four transmission time intervals. The user equipment operable in the D2D communication mode predict an interference level on a communication resource based on an interference history (as described above) the scheduler behavior information, the result of which is used in a D2D radio resource management ("RRM") decision (e.g., to identify a future availability or unavailability of a communication resource element). The aforementioned procedure can be also applied, without limitation, to cellular communications in an LTE-based communication system semi-persistent mode (e.g., to VoIP traffic).

Turning now to FIG. 11, communication resource elements such as communication resource element 1103 again represent time-frequency communication resource elements, and first and second user equipment operable in a cellular communication mode are designated CU1, CU2, respectively, which may cause or experience interference to or from D2D communications on uplink/downlink spectrum of a base station. Different from a round robin procedure, proportional fairness scheduling relies on a communication channel condition of an individual cellular link or path, which largely increases the uncertainty of the scheduling result (i.e., the time/frequency location of communication resource elements allocated to the user equipment). Generally, the prediction procedure can be described as follows: A list of scheduling states is constructed as:

State_Future_Distribution=Predict(State_past_1, State_ast_2, . . . , State_past_N, Scheduler_Behavior_Info), wherein "State_past_n" denotes past scheduling experience, collectively, the scheduling state of the past N time-frequency locations (e.g., a binary value, where a "1" indicates the communication resource element is scheduled, and where a "0" indicates the communication resource element is not scheduled), "N" denotes the number of past information data points that are used to predict a future interference occurrence, and "Scheduler_Behavior_Info" denotes scheduler behavior information such as round robin, proportional fairness, etc. The output "State_Future_Distribution" is the result of the prediction process that could deterministically denote the timing and frequency of the communication resource element location where this user equipment is scheduled. Alternatively, the output State_Future_Distribution could provide a stochastic metric such as a probability for a specific timing and frequency of a communication resource element where the user equipment might be scheduled.

The results of such a determination of likely future communication resource allocations is indicated in FIG. 11 for the first and second user equipment by the crosshatched future communication resource elements. Prediction of assignment by a base station of future communication resource elements is more random in a proportional fairness scheduling procedure than in a round robin scheduling procedure, as indicated by the locations of the crosshatched future communication resource elements in FIG. 11. The future communication resource elements are statistically identified in accordance with a proportional fairness scheduling procedure employing state transition probabilities. The scheduling procedure such as the proportional fairness scheduling procedure may include a flexible interval for each user equipment, as illustrated in FIG. 11 by the time interval 1130 of duration three transmission time intervals.

A Markovian stochastic model has been used in current research to address problem of predicting an uncertain future communication resource, for example as described by S. Haykin in the paper entitled "Cognitive Radio: Brain-Empowered Wireless Communications," IEEE Journal on Selected Areas in Communications, vol. 25, pp. 201-220, February 2005, by S. Haykin, K. Huber, and Z. Chen, in the paper entitled "Bayesian Sequential State Estimation for MIMO Wireless Communications," Proc. IEEE (Special Issue on Sequential State Estimation), vol. 92, no. 3, pp. 439-454, March 2004, and by Vamsi Krishna Tumuluru, Ping Wang and Dusit Niyato, in the paper entitled "Channel Status Prediction for Cognitive Radio Networks," Wirel. Commun. Mob. Comput. vol. 10, pp. 1-13, 2010, which three papers are incorporated herein by reference. The training procedures described in existing research works are primarily directed to base stations, and ignore prediction processes in user equipment, especially operable in a D2D communication mode.

Figure 12:
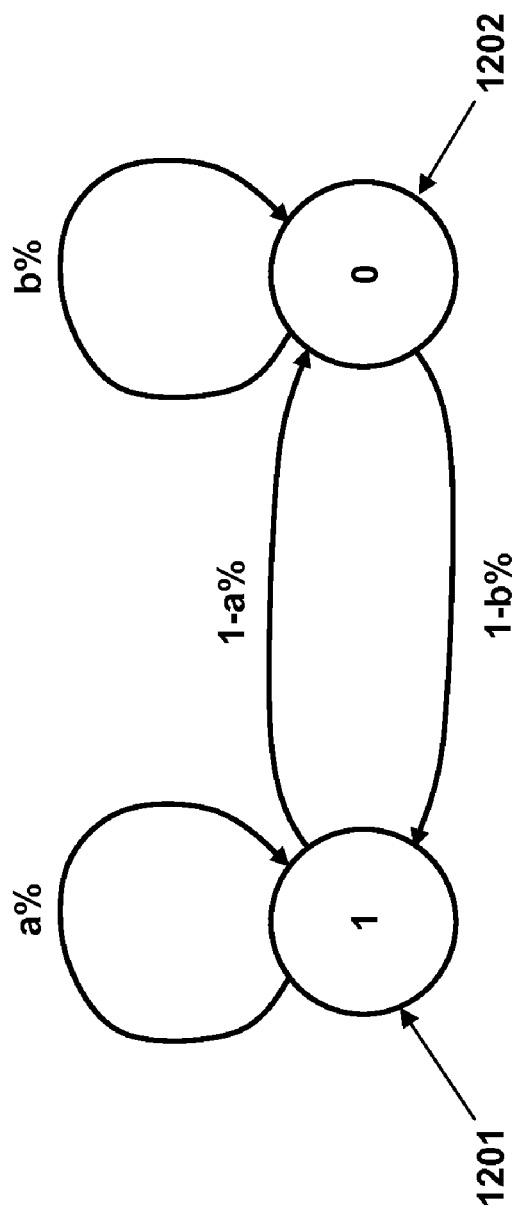
FIG. 12 illustrates an exemplary state transition diagram of a Markov model for a single-state Markov transition procedure that can be employed for stochastic communication resource element prediction in accordance with the principles of the present invention.

Turning now to FIG. 12, illustrated is an exemplary state transition diagram of a Markov model for a single-state Markov transition procedure that can be employed for stochastic communication resource element prediction in accordance with the principles of the present invention. The diagram indicates that if a particular communication resource element assigned by a base station is in a scheduled state, as indicated by the "1" in circle 1201, it will remain in that scheduled state with probability a percent ("%"), and transition to an unscheduled state, as indicated by the "0" in circle 1202, with probability 1-a %. Similarly, if the communication resource element is in the unscheduled state as indicated by the "0" in circle 1202, it will remain in that unscheduled state with probability b %, and transition to the scheduled state as indicated by the "1" in circle 1201, with probability 1-b %. The Predict (State_past_1, . . . ) function described above is now a function representing random transitions in an N-state Markov process. In this case, transition probabilities among states (e.g., a %, b %) and the value N, are included in scheduler behavior information that is sent to the user equipment operable in the D2D communication mode.

Prediction of probabilities of future states can be performed by multiplying a vector representing current communication resource element utilization by a Markov transition matrix, which is generally a square matrix with rows that some to unity. The construction and use of a Markov transition matrix per se to compute a vector of probabilities at a future time point is a technique well known in the mathematical arts, and will not be described further herein in the interest of brevity. The possibility of applying other analytic tools to solve the stochastic prediction problem (e.g., neural networks, machine learning, autoregressive models, etc.) is not prevented. In this way, the most appropriate tools or data used in interference prediction can be included in the scheduler behavior information.

An exemplary interference prediction procedure introduced herein can be summarized as follows: The location of communication resource elements for user equipment operable in the cellular communication mode can be reused by user equipment operable in the D2D communication mode by PDCCH decoding. This datum serves as interference history in prediction procedure. The scheduler behavior information is transmitted by a base station to user equipment to indicate key parameters of cellular communication scheduling:

Scheduling Method=PF,
Scheduling PF Prediction Tool=Markov,
Scheduling PF Markov a %= . . . , Scheduling PF Markov b %= . . . , etc.

The user equipment operable in the D2D communication mode can predict an interference level on a communication resource as a function of the interference history and the scheduler behavior information, and use the prediction result in a D2D radio resource management decision (e.g., to identify a future availability or unavailability of a communication resource element).

Thus, a predication-based process for D2D communication resource selection has been introduced to avoid cellular interference with a D2D communication path that is amenable to practical implementation. Base station scheduler behavior information is employed to convey key parameters of the behavior of the base station scheduler to the user equipment, which advantageously improves the accuracy of interference predication at the user equipment. The prediction-based procedure can be also applied in downlink spectrum, where uplink grant-dependent schemes cannot be applied, since there is insufficient time between downlink scheduling and downlink transmission. The prediction procedure can be integrated with earlier D2D radio resource management procedures. The procedure can be applied in uplink spectrum, and the prediction procedure can release the strict requirement of user equipment processing capability and timing limit compared to uplink grant-dependent methods.

Since the interference prediction procedure relies on a local measurement, continuous PDCCH decoding is not required. Even though PDCCH decoding may be employed from time to time to obtain specific information about a user equipment operable in the cellular communication mode, the user equipment operable in the D2D communication mode can at least temporarily cease decoding a PDCCH once training to the prediction procedure is finished (i.e., the prediction result is verified as reliable and stable). The procedure can be extended to more generic scenarios in which ad-hoc communication system is taken as secondary usage under an infrastructure-based primary communication system.

Thus, an apparatus, method and system have been introduced herein to predict interference employing scheduler behavior information in a communication system. In one embodiment, an apparatus (e.g., embodied in a user equipment operable in a D2D communication mode) includes a processor and memory including computer program code. The memory and the computer program code are configured, with the processor, to cause the apparatus to receive scheduler behavior information for an allocation of communication resources, and produce an interference history associated with at least one of a communication resource and a user equipment operable in a cellular communication mode. The memory and the computer program code are further configured, with the processor, to cause the apparatus to predict an interference level on the communication resource as a function of the interference history and the scheduler behavior information for a user equipment operable in a device-to-device communication mode.

In another embodiment, an apparatus (e.g., embodied in a user equipment) includes a processor and memory including computer program code. The memory and the computer program code are configured to, with the processor, cause the apparatus to receive scheduler behavior information for an allocation of communication resources, and determine a transmission time interval to decode a physical downlink control channel of a user equipment in accordance with the scheduler behavior information. Although the apparatus, method and system described herein have been described with respect to cellular-based communication systems in an ad-hoc communication system, the apparatus and method are equally applicable to other types of communication systems.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
a processor; and
memory including computer program code,
said memory and said computer program code configured to, with said processor, cause said apparatus to perform at least the following:
receive scheduler behavior information for an allocation of communication resources;
produce an interference history associated with at least one of a communication resource and a user equipment operable in a cellular communication mode; and
predict an interference level on said communication resource as a function of said interference history and said scheduler behavior information for a user equipment operable in a device-to-device communication mode.

2. The apparatus as recited in claim 1 wherein said memory and said computer program code are further configured to, with said processor, cause said apparatus to assign said communication resource to said user equipment operable in said device-to-device communication mode.

3. The apparatus as recited in claim 1 wherein said memory and said computer program code are further configured to, with said processor, cause said apparatus to performing spectrum sensing to produce said interference history.

4. The apparatus as recited in claim 1 wherein said memory and said computer program code are further configured to, with said processor, cause said apparatus to perform spectrum sensing to confirm an availability of said communication resource.

5. The apparatus as recited in claim 1 wherein said memory and said computer program code are further configured to, with said processor, cause said apparatus to decode a physical downlink control channel of said user equipment operable in said cellular communication mode to produce said interference history.

6. The apparatus as recited in claim 1 wherein said memory and said computer program code are further configured to, with said processor, cause said apparatus to employ said scheduler behavior information to determine a transmission time interval to decode a physical downlink control channel of said user equipment operable in said cellular communication mode.

7. The apparatus as recited in claim 1 wherein said memory and said computer program code are further configured to, with said processor, cause said apparatus to receive said scheduler behavior information over a broadcast channel or over a dedicated channel via radio resource control signaling.

8. The apparatus as recited in claim 1 wherein said scheduling behavior information is derived in accordance with a round robin scheduling procedure or a proportional fairness scheduling procedure.

9. An apparatus, comprising:
a processor; and
memory including computer program code,
said memory and said computer program code configured to, with said processor, cause said apparatus to perform at least the following:
receive, from a base station, scheduler behavior information for an allocation of communication resources, wherein the scheduler behavior information comprises information about a scheduling procedure used by the base station; and
determine a transmission time interval to decode a physical downlink control channel of a user equipment in accordance with said scheduler behavior information.

10. The apparatus as recited in claim 9 wherein said memory and said computer program code are further configured to, with said processor, cause said apparatus to produce an interference history associated with said user equipment, and predict an interference level on a communication resource as a function of said interference history and said scheduler behavior information for a user equipment operable in a device-to-device communication mode.

11. The apparatus as recited in claim 9 wherein said memory and said computer program code are further configured to, with said processor, cause said apparatus to receive said scheduler behavior information over a broadcast channel or over a dedicated channel via radio resource control signaling.

12. The apparatus as recited in claim 9 wherein said scheduling behavior information is derived in accordance with a round robin scheduling procedure or a proportional fairness scheduling procedure.

13. A method, comprising:
receiving, by a user equipment, scheduler behavior information for an allocation of communication resources;
producing, by a user equipment, an interference history associated with at least one of a communication resource and a user equipment operable in a cellular communication mode; and
predicting, by a user equipment, an interference level on said communication resource as a function of said interference history and said scheduler behavior information for a user equipment operable in a device-to-device communication mode.

14. The method as recited in claim 13 further comprising assigning said communication resource to said user equipment operable in said device-to-device communication mode.

15. The method as recited in claim 13 further comprising performing spectrum sensing to produce said interference history.

16. The method as recited in claim 13 further comprising performing spectrum sensing to confirm an availability of said communication resource.

17. The method as recited in claim 13 further comprising decoding a physical downlink control channel of said user equipment operable in said cellular communication mode to produce said interference history.

18. The method as recited in claim 13 further comprising employing said scheduler behavior information to determine a transmission time interval to decode a physical downlink control channel of said user equipment operable in said cellular communication mode.

19. The method as recited in claim 13 further comprising receiving said scheduler behavior information over a broadcast channel or over a dedicated channel via radio resource control signaling.

20. The method as recited in claim 13 wherein said scheduling behavior information is derived in accordance with a round robin scheduling procedure or a proportional fairness scheduling procedure.

* * * * *